United States Patent
Jeon et al.

(10) Patent No.: US 7,218,825 B2
(45) Date of Patent: May 15, 2007

(54) OPTICAL WAVEGUIDE HAVING CURVED REFLECTING MIRROR SURFACE AND METHOD OF MANUFACTURING THE SAME

(75) Inventors: Keum Soo Jeon, Gyeonggi-Do (KR); Min Su Lee, Gyeonggi-Do (KR); Sung Ho Kang, Gyeonggi-Do (KR); Yong Wook Kim, Gyeonggi-Do (KR); In Su Park, Gyeonggi-Do (KR)

(73) Assignee: Doosan Corporation, Seoul (KR)

( * ) Notice: Subject to any disclaimer, the term of this patent is extended or adjusted under 35 U.S.C. 154(b) by 0 days.

(21) Appl. No.: 11/285,621

(22) Filed: Nov. 22, 2005

(65) Prior Publication Data

US 2007/0077005 A1    Apr. 5, 2007

(30) Foreign Application Priority Data

Oct. 5, 2005    (KR) .................... 10-2005-0093614

(51) Int. Cl.
*G02B 8/10* (2006.01)
*G02B 6/26* (2006.01)

(52) U.S. Cl. ........................................ 385/129; 385/52

(58) Field of Classification Search ................ 385/129, 385/52

See application file for complete search history.

(56) References Cited

U.S. PATENT DOCUMENTS

| | | | |
|---|---|---|---|
| 4,735,677 A * | 4/1988 | Kawachi et al. .............. 438/25 |
| 4,828,362 A * | 5/1989 | Skinner et al. ................ 385/18 |
| 5,359,687 A * | 10/1994 | McFarland et al. ........... 385/49 |
| 5,659,647 A * | 8/1997 | Kravitz et al. ................ 385/52 |
| 6,912,232 B1* | 6/2005 | Duffield et al. ............. 370/468 |
| 7,039,275 B2* | 5/2006 | Williamson ................... 385/33 |
| 7,050,691 B2* | 5/2006 | Ishizaki et al. ............. 385/132 |
| 2002/0015800 A1* | 2/2002 | Miyamoto et al. .......... 427/553 |
| 2005/0248046 A1* | 11/2005 | Ohtsu et al. ................ 264/1.25 |
| 2006/0008224 A1* | 1/2006 | Shimizu et al. ............. 385/129 |

* cited by examiner

*Primary Examiner*—Michelle Connelly-Cushwa
*Assistant Examiner*—Kajli Prince
(74) *Attorney, Agent, or Firm*—Harness, Dickey & Pierce, P.L.C.

(57) ABSTRACT

The present invention relates to an optical waveguide having a curved reflecting mirror surface for optical coupling and a method of manufacturing it. The method of manufacturing an optical waveguide includes the steps of coating a transparent glass substrate with a photosensitive material; radiating ultraviolet rays onto the photosensitive material through a mask in which the shape of the optical waveguide and partition blocks formed beside ends of the optical waveguide are patterned; manufacturing a photoresist stamp by developing patterns onto which the ultraviolet ray has been radiated through the mask; forming a PolyDiMethyl-Siloxane (PDMS) mold by coating the photo stamp with PDMS, and forming a core; forming the optical waveguide, in which the partition blocks are formed beside the ends thereof, using the PDMS mold; and dropping liquid polymer between the partition blocks formed beside the ends of the optical waveguide using an inkjet header and hardening it. This structure and manufacturing method have advantage in that optical waveguides having variously shaped reflecting mirror surfaces are simply and economically manufactured.

11 Claims, 15 Drawing Sheets

FIG. 1

PRIOR ART

OPTICAL WAVEGUIDE HAVING CURVED REFLECTING MIRROR SURFACE AND METHOD OF MANUFACTURING THE SAME

BACKGROUND OF THE INVENTION

1. Field of the Invention

The present invention relates generally to an optical waveguide with a curved reflecting mirror surface for vertical coupling of light and a method of manufacturing the same in a practical process, which is suitable for mass production using inkjet technology.

2. Description of the Related Art

In general, the electrical connections between circuit boards, chips or systems are implemented using a metallic wire. However, as the capacity of information is getting larger and transmission speed dramatically increases, electrical problems such as skew in clock signals and electromagnetic interference (EMI) restrict speed of today's electronic systems to the limit of a few GHz.

Furthermore, thermal dissipation is another serious problem in high speed electronic systems. To overcome such problems, optical interconnection is introduced into circuit board level. Optical interconnection has great advantage over electronic wiring, not causing any EMI and thermal problems. However, vertical coupling of light on circuit board is a great challenge in routing optical signals, on the basis that most of opto-electronic components are packaged as a form of surface-mounted device.

Recently, optical coupling technologies using an optical transceiver (transmitter/receiver) module has been developed. There has been typical three vertical coupling ways known to those skilled in the art: first, directly coupling an photo-detecting device to a ribbon optical fiber or a multi-channel optical connector with a reflecting mirror inclined at an angle of 45°; secondly, coupling optical transceiver devices to a polymer optical waveguide with a reflecting mirror, which is cut at an angle of 45°; lastly, a method of perpendicularly integrating optical transceiver devices, which are packaged in a single module, with a multi-channel optical connector.

In the above cases, a Vertical Cavity Surface Emitting Laser (VCSEL) array is commonly used as a light source, while a photodiode array is used as a photo-detector.

Various optical interconnection modules for vertical coupling of light into an optical waveguide have been developed.

For example, an optical module disclosed in Korean Patent Application No. 2000-7003642 is designed in such a way that light emitted from a VCSEL is reflected through 90° at the end portion of optical waveguide and is transmitted to an optical fiber, which is connected to an optical connector, along a core formed in a substrate.

Meanwhile, Korean Unexamined Patent Publication 2003-94712 discloses a parallel optical interconnection transceiver module including an optical waveguide with a lens-type reflecting surface. This structure has advantage in reducing coupling loss caused by misalignment between optical components at coupling stage.

Figure 1:
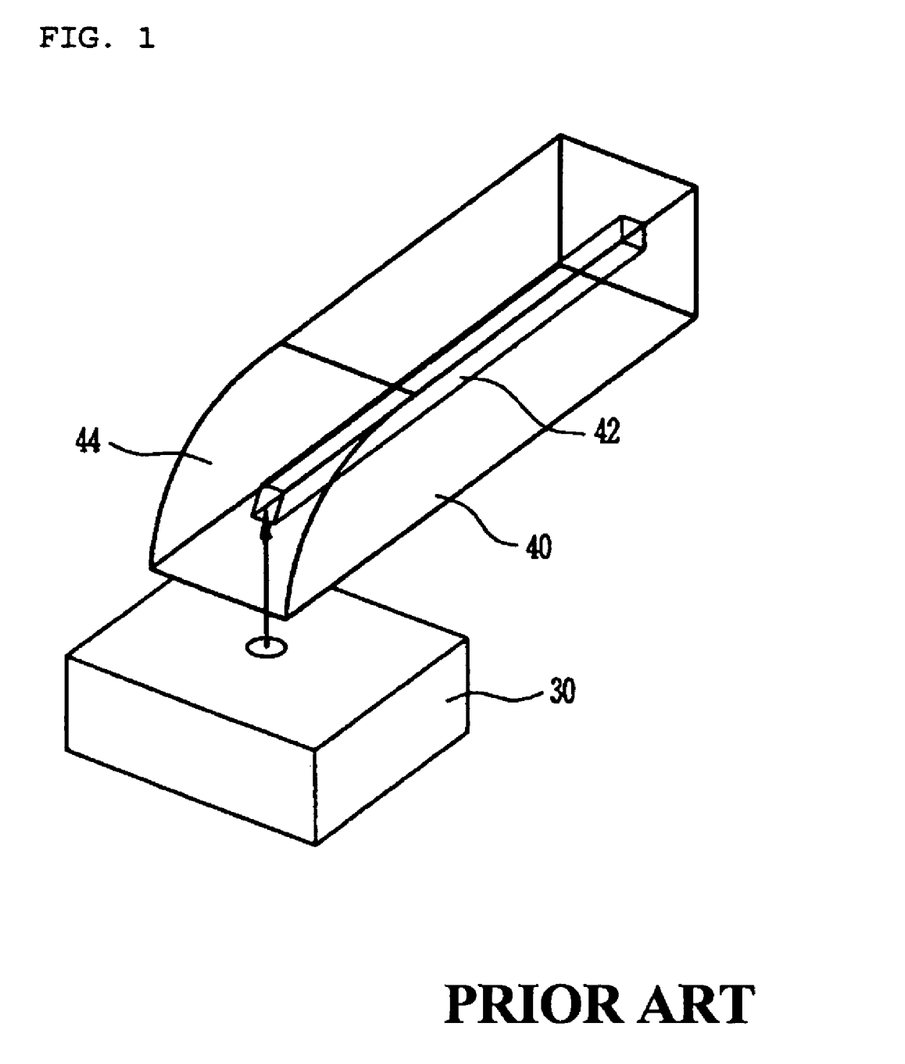
FIG. 1 is a diagram showing a perspective view of a conventional parallel optical interconnection module.

FIG. 1 shows the structure of the optical waveguide 40 having the curved reflecting surface that is disclosed in Korean Unexamined Patent Publication No. 2003-94712.

Referring to FIG. 1, a curved reflecting surface 44 has a predetermined curvature, which is formed at an end of the core 42 of the optical waveguide 40.

The core 42 is made of polymer or epoxy-based material transparent to specified wavelength range. The reflectance of light incident at the reflecting surface 44 strongly depends on the shape of it. To increase reflectance, reflecting surface 44 is circularly rounded with predetermined curvature.

Many methods of forming a mirror surface for vertical coupling have been proposed.

For example, 45 degree mirror surface can be fabricated by polishing the surface after cutting with a 90 degrees diamond dicing saw or a microtome blade.

Unlike the process of manufacturing the 45 degree mirror surface, the circular mirror surface shown in FIG. 1 is manufactured using an X-ray lithography process. The X-ray lithography can shape various types of objects that have 3-dimensional structure. But it needs relatively long processing time as well as expensive equipment such as a particle accelerator, which is not suitable for mass production at economical cost.

SUMMARY OF THE INVENTION

Accordingly, the present invention has been made keeping in mind the above problems of previous art, and an objective of the present invention is to provide a method of manufacturing an optical waveguide 3-dimensionally curved reflecting mirror surface, which allows various curved mirror surfaces using an inkjet method.

In order to accomplish the above objective, the present invention provides an optical waveguide, including a glass substrate on which the optical waveguide is layered; a clad layer formed on the substrate; a core layer formed on the clad layer and configured to transmit light; partition blocks extending from the ends of the optical waveguide; and an elliptically curved reflecting mirror surface formed between the partition blocks and configured to change a path of light to the core layer by reflecting the light.

In the optical waveguide according to the present invention, the elliptical mirror surface is formed by dropping liquid polymer between the partition blocks using an inkjet header and hardening it.

In the optical waveguide according to the present invention, the liquid polymer is made of material identical to polymer for the core layer.

In the optical waveguide according to the present invention, alignment marks for aligning a Vertical Cavity Surface Emitting Laser (VCSEL) array or a photodiode array are formed beside the ends of the optical waveguide.

In the optical waveguide according to the present invention, the reflecting mirror surface is a convex or concave curved surface.

Furthermore, the present invention provides a method of manufacturing an optical waveguide, including the steps of coating a transparent glass substrate with a photosensitive material; radiating ultraviolet rays onto the photosensitive material through a mask in which a shape of the optical waveguide and partition blocks formed beside ends of the optical waveguide; manufacturing a photoresist stamp by developing waveguide patterns, onto which the ultraviolet rays have been radiated through the mask; forming a Poly-DiMethylSiloxane (PDMS) mold by coating the photo stamp with PDMS, and forming a core; forming the optical waveguide, in which the partition blocks are formed beside the ends thereof, using the PDMS mold; and dropping liquid polymer between the partition blocks formed beside the ends of the optical waveguide using an inkjet header and hardening it.

In the method according to the present invention, alignment marks for alignment of a VCSEL array or photodiode array are further patterned in the mask, and the alignment marks are further formed beside the ends of the optical waveguide.

The method according to the present invention further includes the step of controlling a tilt angle of a substrate on which the optical waveguide is formed.

In the method according to the present invention, the controlling step is performed by putting the substrate, on which the optical waveguide is formed, together with a base, on a goniometer, and varying an angle thereof.

The method according to the present invention further includes the step of performing surface treatment on inside surfaces of the partition blocks, which have a spanner shape.

In the method according to the present invention, the optical waveguide has an array structure in which a plurality of optical waveguides is formed on a single glass substrate.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

FIGS. 2A to 2M are detailed diagrams showing a process of manufacturing an optical waveguide array having curved reflecting mirror surfaces.

The process of manufacturing the optical waveguide array having the curved reflecting mirror surfaces 45 is divided into the following main steps.

Figure 3A:
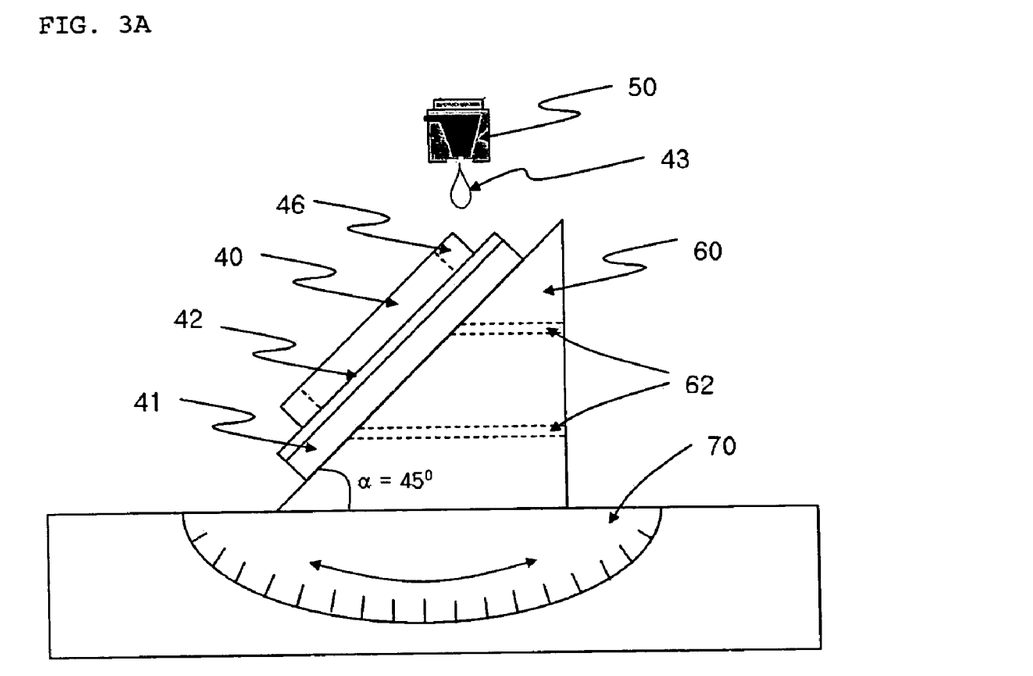
FIGS. 3A to 3C are schematic diagrams showing a method of manufacturing a curved reflecting mirror surface using inkjet technology.

That is, the process includes a first step of manufacturing optical waveguides 40 having partition blocks 46 and VCSEL/PD array alignment marks 48 beside the ends of the optical waveguides, and a second step of forming elliptically curved surfaces by dropping polymer between the partition blocks 46 beside the ends of the optical waveguides using an inkjet header 50 (see FIG. 3A).

FIGS. 2A to 2M are diagrams showing the process of manufacturing the optical waveguide array having the partition blocks 46 and the VCSEL/PD array alignment marks 48 beside the ends of the optical waveguides 40.

First, a step of manufacturing a photoresist stamp 15 is performed. In detail, a photosensitive material 16 is applied to a glass substrate 10, and then an ultraviolet ray is radiated onto the photosensitive material 16 through a mask in which the partition blocks 46, for the formation of the shapes of the optical waveguides and curved reflecting mirror surfaces at the ends of the optical waveguides, and alignment marks 48, for the alignment of VCSEL/PD arrays, are patterned (FIGS. 2A and 2B).

Figure 2A:
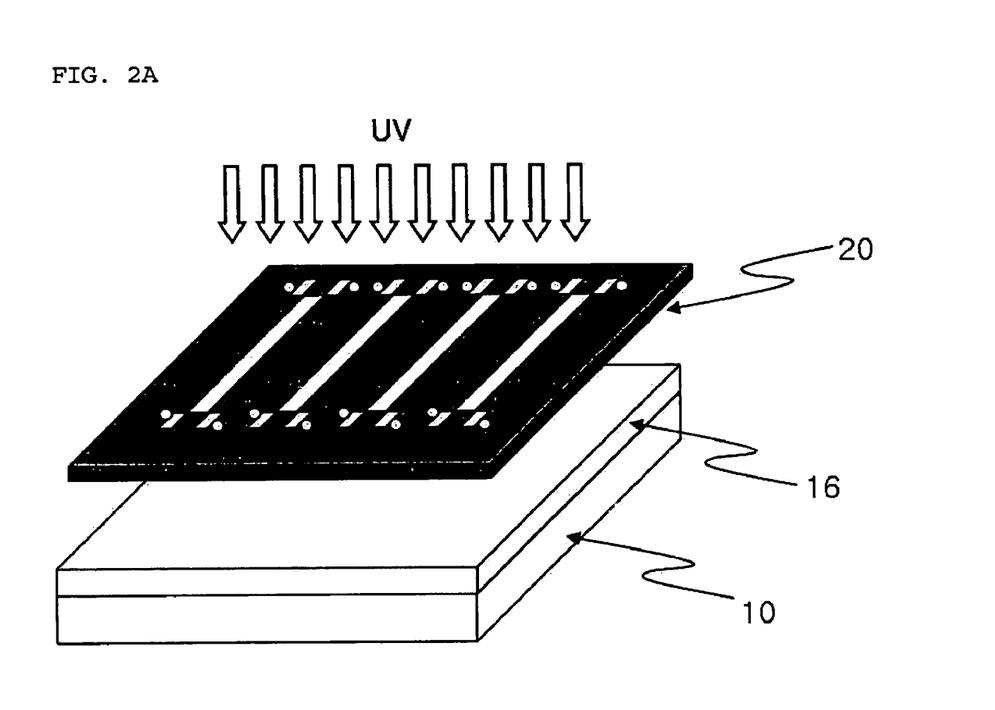
FIGS. 2A to 2M are diagrams showing a process of manufacturing an optical waveguide array including partition blocks for forming curved reflecting mirror surfaces and VCSEL/PD array alignment marks.
Figure 2B:
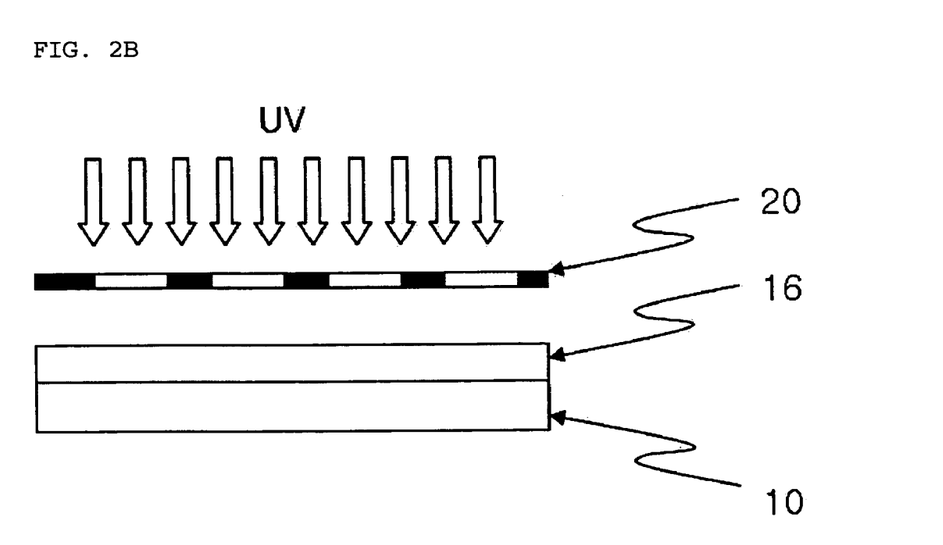

FIG. 2A is a perspective view of the optical waveguide array, and FIG. 2B is a sectional view of FIG. 2A.

Figure 2C:
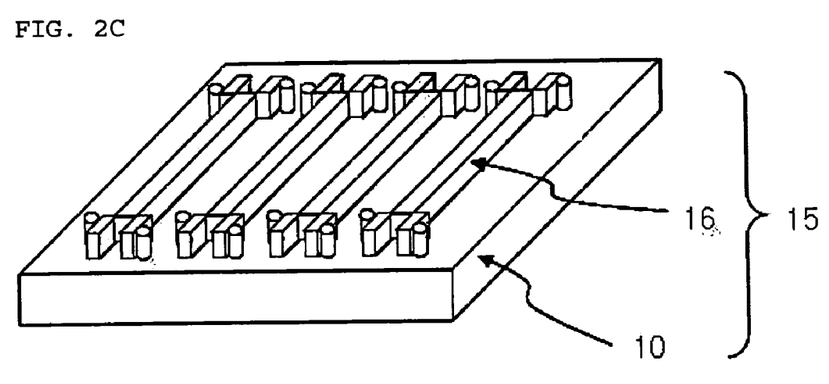
Figure 2D:
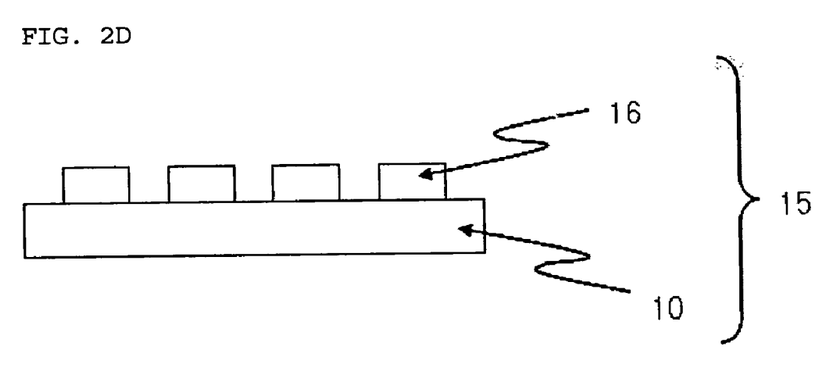

The photoresist stamp 15 for the manufacture of the optical waveguides 40 having the partition blocks 46 and the alignment marks 48 is manufactured by etching the photosensitive material 16 onto which the ultraviolet ray has been radiated (FIGS. 2C and 2D).

FIG. 2C is a perspective view of the photoresist stamp, and FIG. 2D is a sectional view of the photoresist stamp.

Figure 2E:
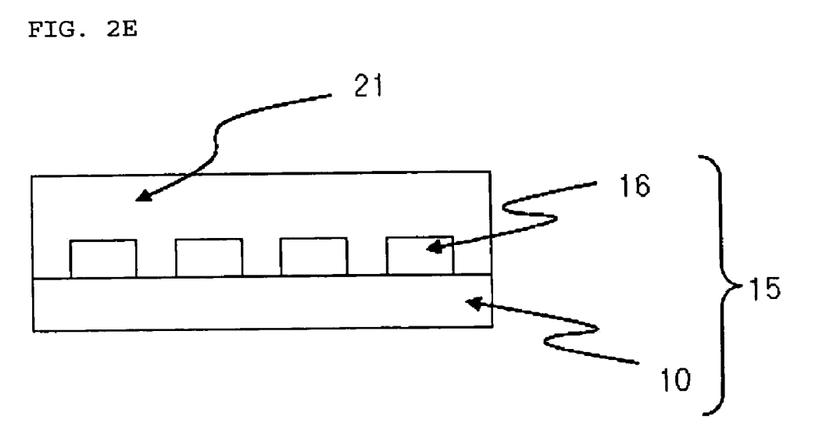

The photoresist stamp 15 is coated with PolyDiMethyl-Siloxane (PDMS) 21 and is then hardened using ultraviolet radiation (FIG. 2E).

Figure 2F:
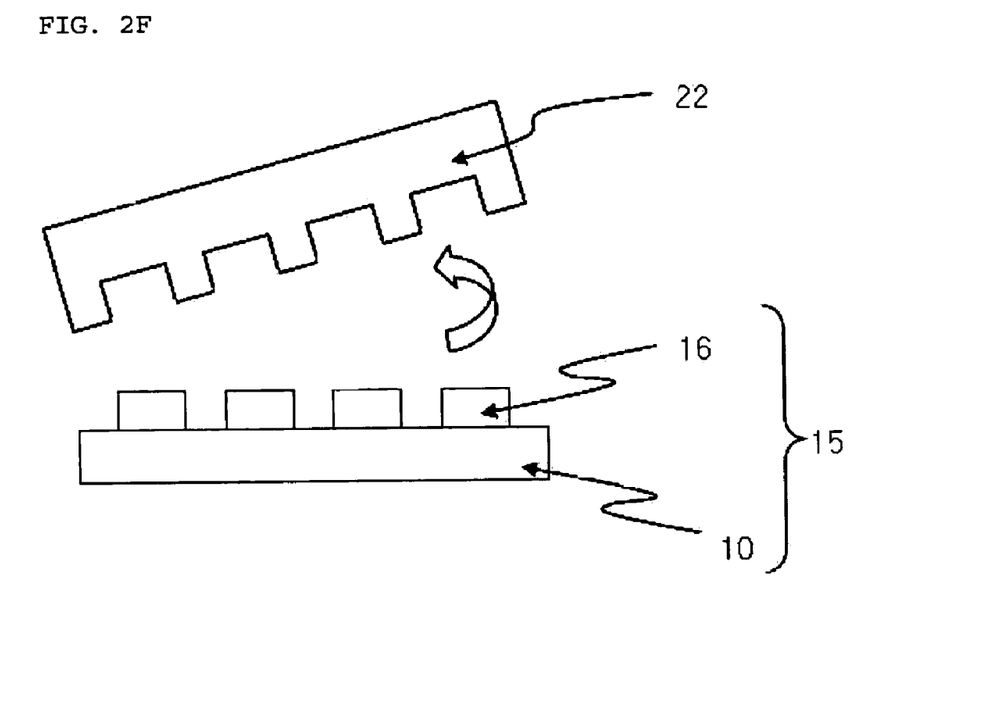
Figure 2G:
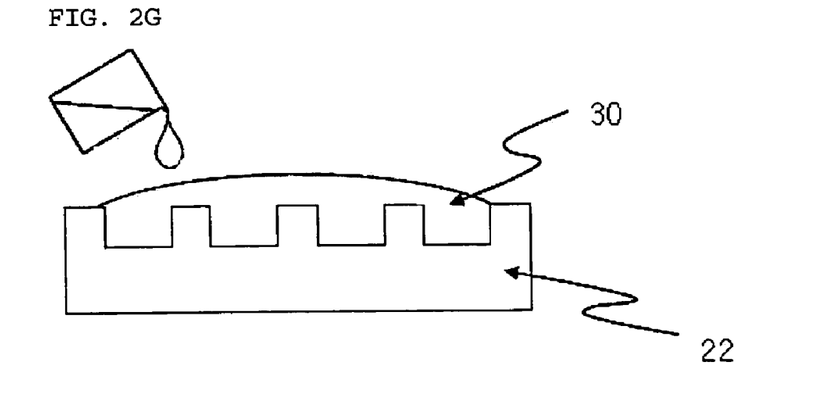

Next, the PDMS 21 is separated from the photoresist stamp 15, and a PDMS mold 22 is manufactured using the PDMS 21 (FIG. 2F).

Figure 2H:
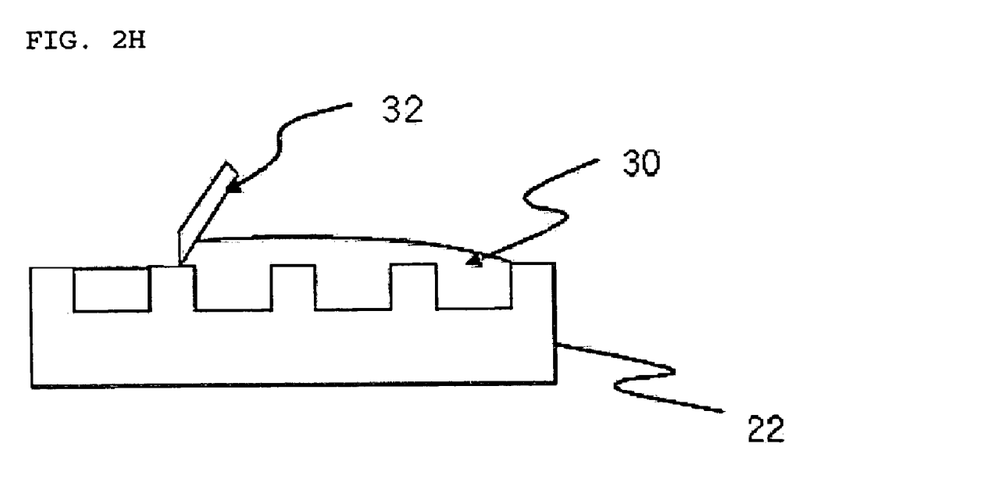
Figure 2I:
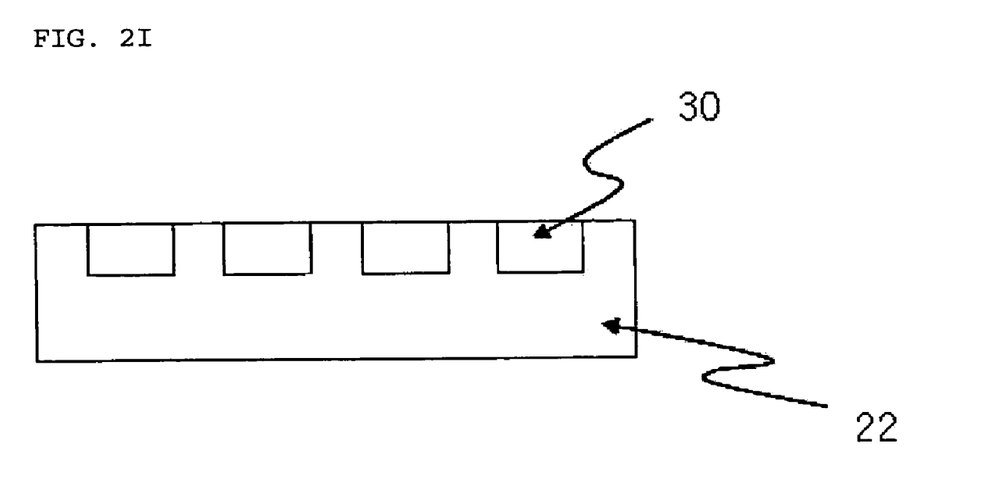

Then, the PDMS mold 22 is coated with polymer 30 for a core (for example, ZP51 available from Chemoptics Corporation) (FIG. 2G), and excessive polymer is removed using a blade 32 (FIGS. 2H and 2I).

Figure 2J:
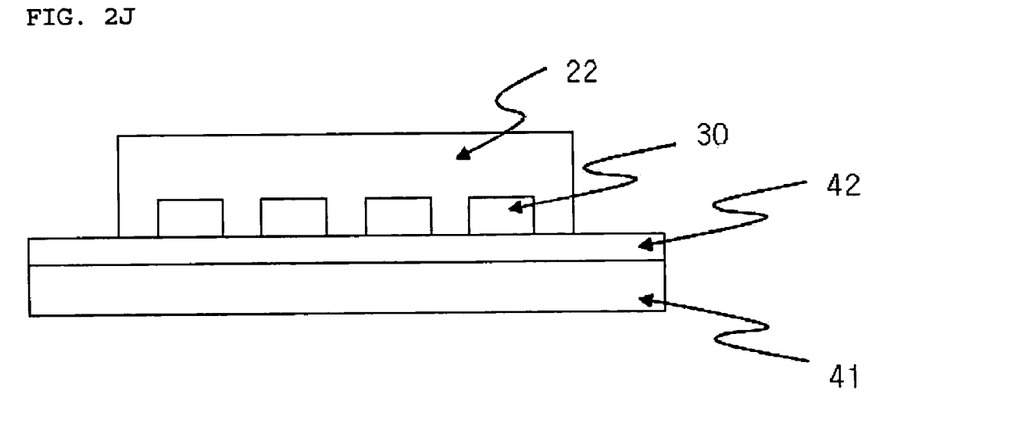
Figure 2K:
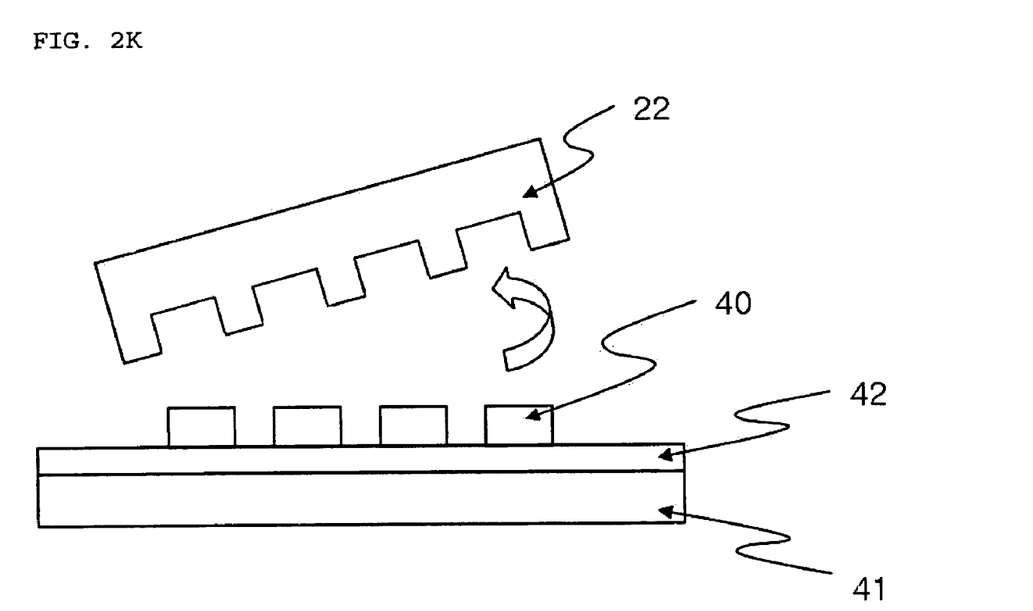

The PDMS mold 22, which has been filled with the polymer for a core, is attached onto a transparent glass substrate 41 coated with a cladding layer 42 (for example, ZP49, available from Chemoptics Corporation), and heat and pressure are applied thereto (FIG. 2J).

Thereafter, only the PDMS mold 22 is separated from the glass substrate 41 (FIG. 2K), and then the optical waveguides 40 having the partition blocks 46 and the alignment marks 48 beside the ends of the optical waveguides 40 are formed.

Figure 2L:
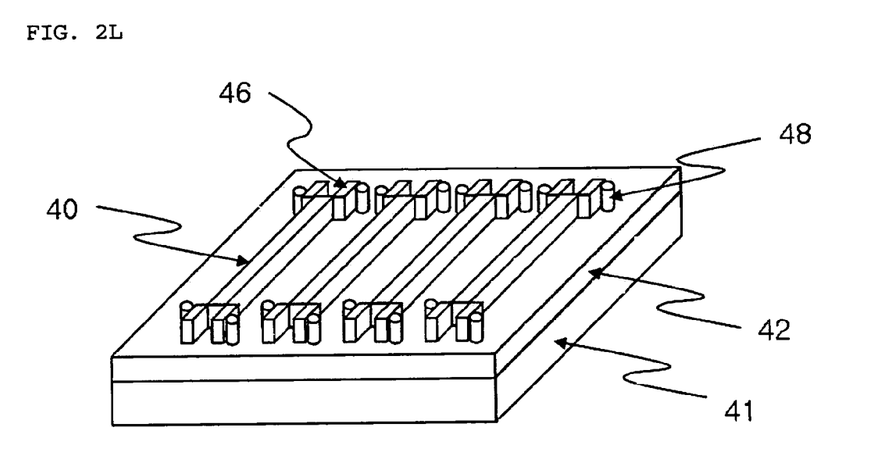
Figure 2M:
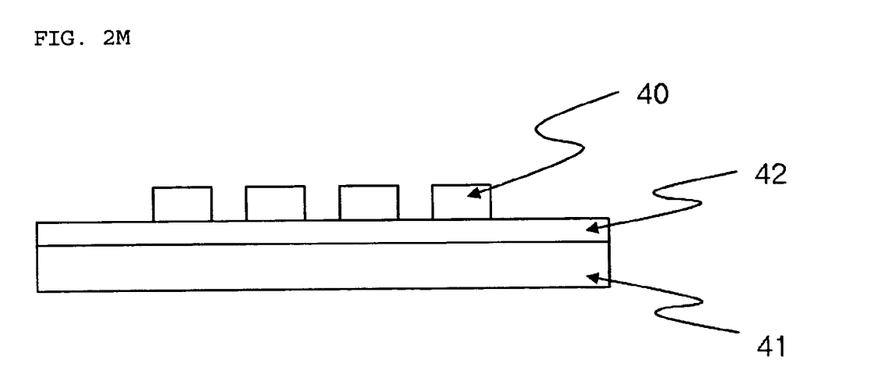

FIG. 2L is a perspective view of the optical waveguides in which the partition blocks 46 and the alignment marks 48 are formed on the glass substrate, and FIG. 2M is a sectional view of FIG. 2L.

The refractive indices and sizes of the cladding layer 42 and the core 40 are selected such that optical coupling efficiency is maximized, in consideration of the specifications of optical fibers and the VCSEL/PD.

Finally, by performing a step of dropping liquid polymer 43 between the partition blocks 46 formed beside the ends of the optical waveguides 40 using an inkjet header 50 and hardening the liquid polymer, various curved surfaces such as 2-dimensional or 3-dimensional surfaces at the ends of the optical waveguides are manufactured.

Figure 3B:
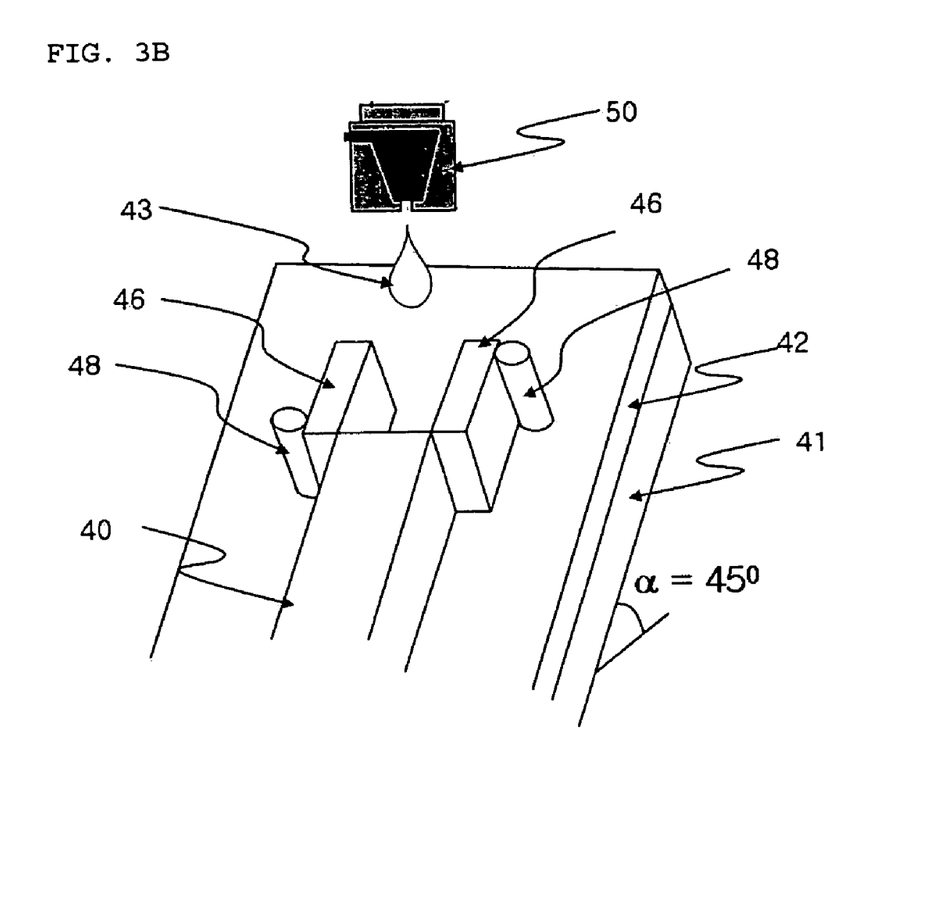
Figure 3C:
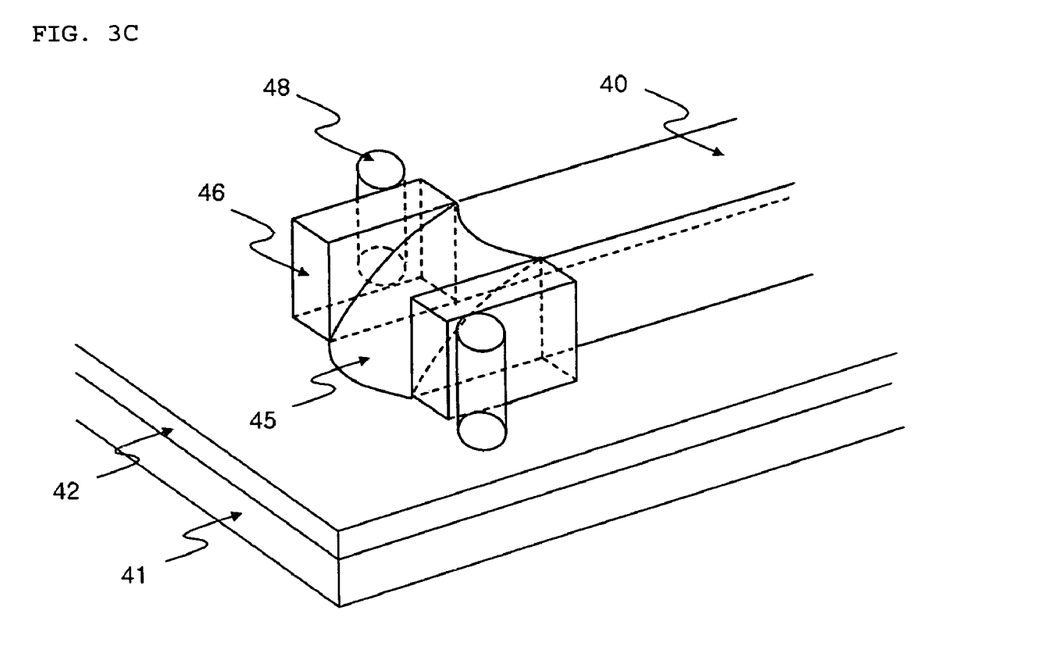

FIGS. 3A to 3C are diagrams showing a method for manufacturing a curved reflecting mirror surface using inkjet technology according to the present invention.

Referring to FIG. 3A, the manufactured optical waveguide 40 is located on a right triangle-shaped base 60, the inclined surfaces of which have 45 degrees, and is fixed on the base 60 using the vacuum of a vacuum holder. Then, a desired amount of polymer (the same material as the polymer for a core, for example, ZP51 available from Chemoptics Corporation) is dropped between the partition blocks 46 using the inkjet header 50 as shown in FIG. 3B, thereby forming a 3-dimensionally curved reflecting mirror surface 45 at an end of the optical waveguide 40 as shown in FIG. 3C.

The method of manufacturing the optical waveguide according to the present invention may further include a step of controlling the tilt angle of the substrate on which the optical waveguide is formed.

Figure 4A:
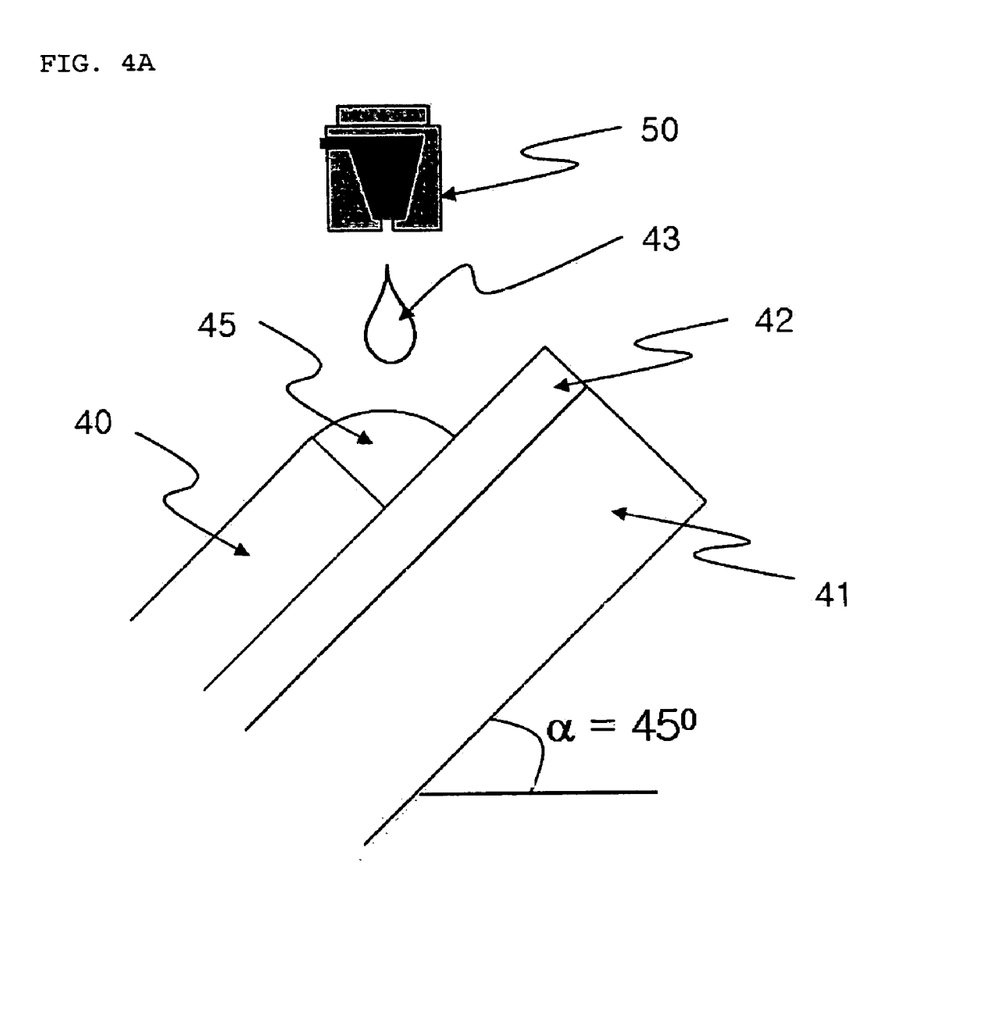
FIGS. 4A to 4C are diagrams showing the formation of curved surfaces according to tilt angle for manufacturing variously shaped curved reflecting mirror surfaces, in the method of manufacturing an optical waveguide according to the present invention.
Figure 4B:
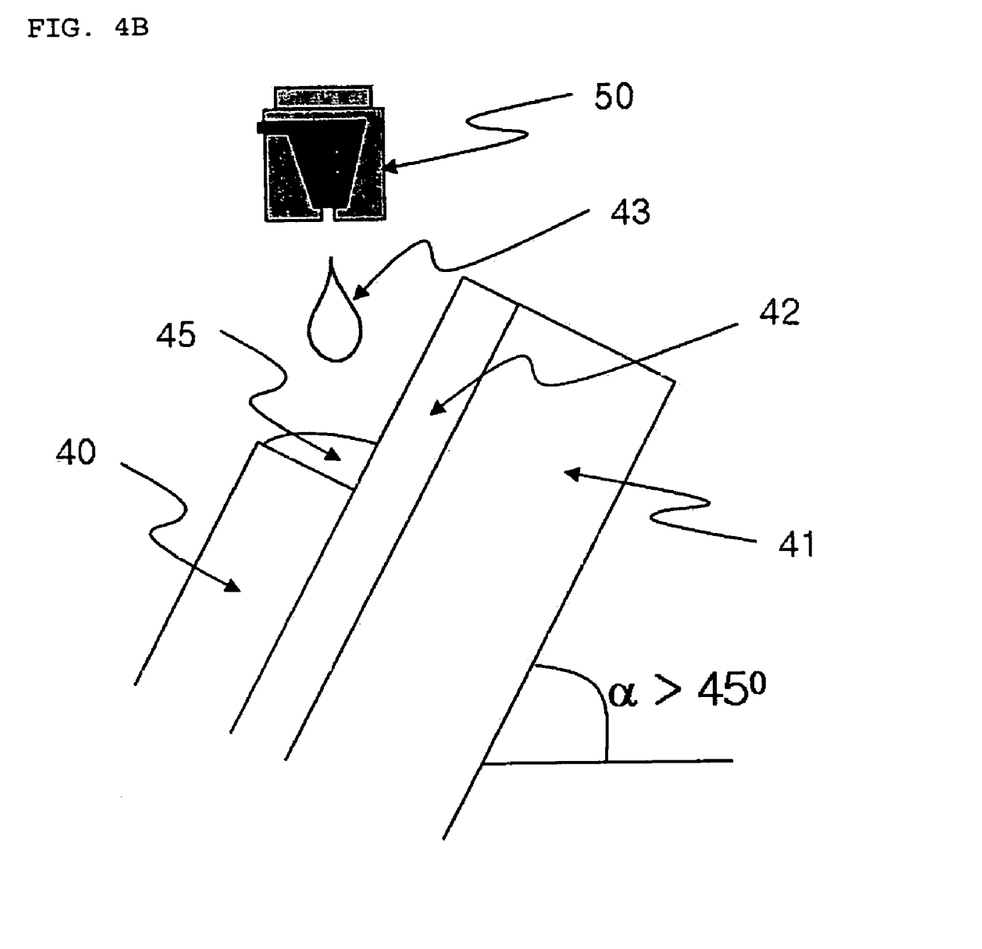
Figure 4C:
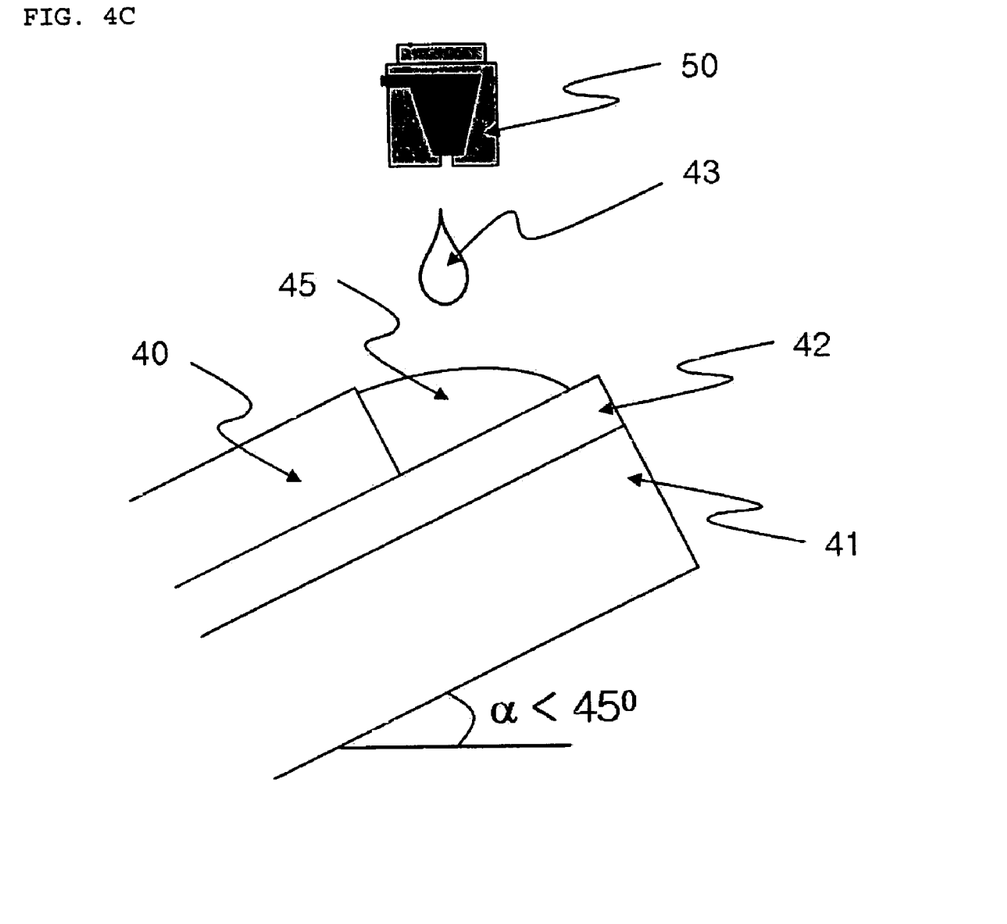

That is, as shown in FIG. 3A, by putting the base 60 on a goniometer 70 and controlling the angle of the goniometer 70, curved mirror surfaces having various shapes as in FIG. 4 can be manufactured.

FIGS. 4A to 4C are diagrams showing a step of forming curved mirror surfaces 45 having various shapes at the ends of the optical waveguides by controlling the angle of the base 60 using the goniometer, in the method of manufacturing the optical waveguide according to the present invention.

That is, when the tilt angle $\alpha$ is 45 degrees, a circular or spherical shape can be acquired. When the tilt angle is larger or smaller than 45 degrees, various elliptically shaped curved surfaces can be acquired.

In particular, in the case where surface treatment is performed to vary the roughness of the inside surfaces of the partition blocks, the surface tension of the liquid polymer varies due to the roughness of the surfaces when the liquid polymer is dropped between the partition blocks and is hardened while in contact with the inside surfaces of the partition blocks, so that a concave curved surface as well as a convex curved surface can be formed.

The reflecting mirror surface 45 having the above-described curved shape reflects an optical signal and guides the light toward the optical waveguide 40 when the optical signal is vertically coupled to the optical waveguide.

Furthermore, the vertical coupling of the optical signal may be applied to the case where an optical signal delivered from the optical waveguide is reflected and delivered to the optical detection device, in a similar manner.

Figure 5A:
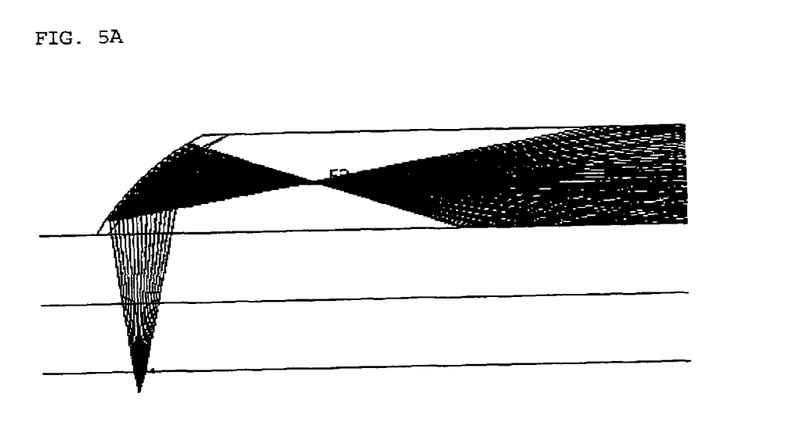
FIGS. 5A and 5B, and 6A and 6B, respectively, are diagrams of simulation results showing vertical optical coupling efficiency in optical waveguides having elliptically and circularly curved surfaces.
Figure 5B:
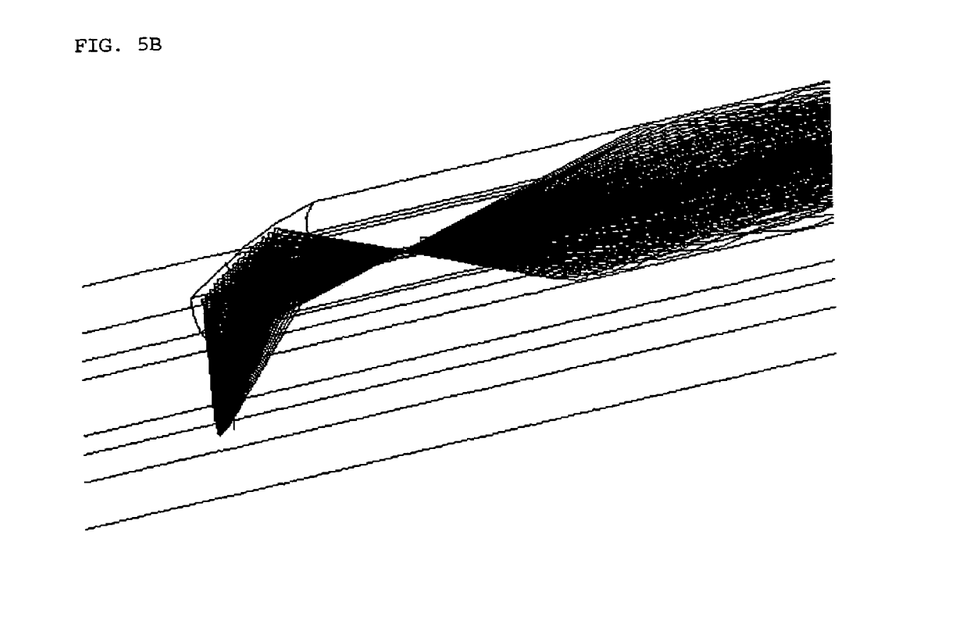
Figure 6A:
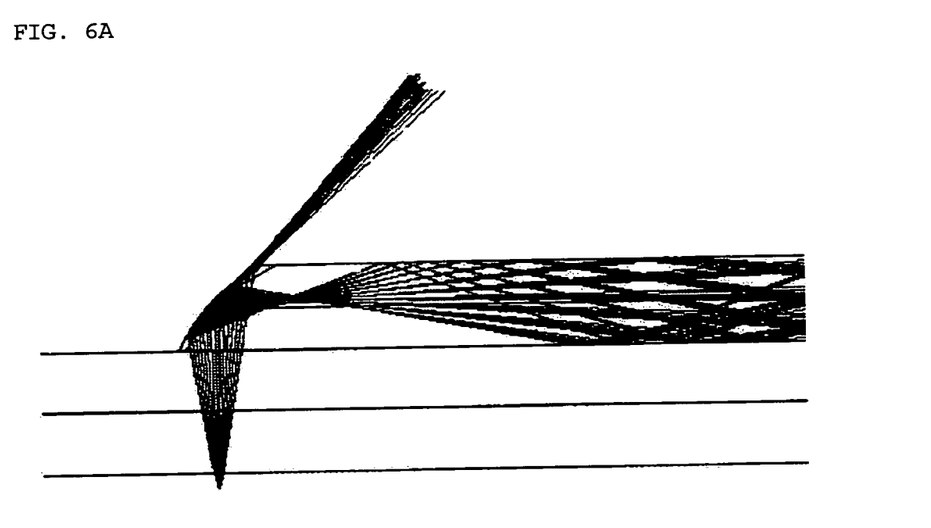
Figure 6B:
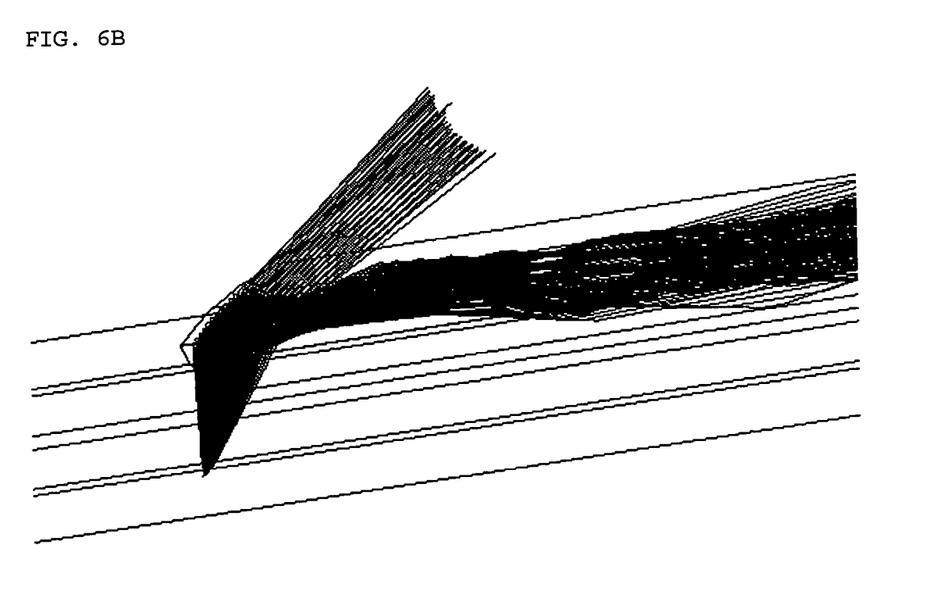

In connection with the vertical optical coupling efficiency of the curved surfaces, the reflecting mirror surfaces having the elliptically curved surface as shown in FIGS. 5A and 5B are superior to the reflecting mirror surfaces having the circularly curved surfaces as shown in FIGS. 6A and 6B.

According to the conventional method, it is only possible to manufacture a cylindrically circular mirror surface, only one side thereof having a circularly curved surface, so that light reflected by the curved surface is scattered and, thus, there is a limitation in that an optical waveguide must be manufactured in a rectangular shape. However, it is possible to manufacture a completely 3-dimensionally curved mirror surface using the method of manufacturing an optical waveguide according the present invention.

As described above, in accordance with the optical waveguide having a curved reflecting mirror surface for optical coupling and a method of manufacturing the same according the present invention, there is an advantage in that optical waveguides having variously shaped reflecting mirror surfaces, including 2-dimensional or 3-dimensional curved reflecting mirror surfaces, can be simply and inexpensively manufactured using an inkjet method.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical waveguide, comprising:
   a glass substrate constituting a stratum of the optical waveguide;
   a clad layer formed on the substrate;
   a core layer formed on the clad layer and configured to transmit light;
   partition blocks continuously extending from the ends of the optical waveguide; and
   a 3-dimensional elliptically curved reflecting mirror surface formed between the partition blocks and configured to change a path of light to the core layer by reflecting the light.

2. The optical waveguide as set forth in claim 1, wherein the elliptical mirror surface is formed by dropping liquid polymer between the partition blocks using an inkjet header and hardening it, while a substrate, on which the partition blocks and the waveguide are patterned, is obliquely applied toward the inkjet header by placing the substrate on a right triangle-shaped base, under which a goniometer is attached to finely adjust a tilt angle.

3. The optical waveguide as set forth in claim 2, wherein the liquid polymer is made of material identical to polymer for the core layer.

4. The optical waveguide as set forth in claim 1, wherein alignment marks for aligning a Vertical Cavity Surface Emitting Laser (VCSEL) array or a photodiode array are formed beside ends of the optical waveguide.

5. The optical waveguide as set forth in claim 1, wherein the reflecting mirror surface is a convex or concave curved surface.

6. A method of manufacturing an optical waveguide, comprising the steps of:
   coating a transparent glass substrate with a photosensitive material;
   radiating ultraviolet rays onto the photosensitive material through a mask in which a shape of the optical waveguide and partition blocks formed beside ends of the optical waveguide are patterned;
   manufacturing a photoresist stamp by developing portions onto which the ultraviolet rays have been radiated through the mask;
   forming a PolyDiMethylSiloxane (PDMS) mold by coating the photo stamp with PDMS, and forming a core;
   forming the optical waveguide, in which the partition blocks continuously extend from the ends of the optical waveguide, using the PDMS mold; and
   dropping liquid polymer between the partition blocks formed beside the ends of the optical waveguide using an inkjet header and hardening it, and forming a 3-dimensional elliptically curved reflecting mirror surface.

7. The method as set forth in claim 6, wherein alignment marks for alignment of a VCSEL array or photodiode array are further patterned in the mask, and the alignment marks are further formed beside ends of the optical waveguide.

8. The method as set forth in claim 6, further comprising the step of controlling a tilt angle of a substrate on which the optical waveguide is formed.

9. The method as set forth in claim 8, wherein the controlling step is performed by putting the substrate, on which the optical waveguide is formed, together with a base, on a goniometer, and varying an angle thereof.

10. The method as set forth in claim 6, further comprising the step of performing surface treatment on inside surfaces of the partition blocks to vary a roughness of the inside surfaces of the partition blocks.

11. The method as set forth in claim 6, wherein the optical waveguide has an array structure in which a plurality of optical waveguides is formed on a single glass substrate.

* * * * *